US009024942B2

(12) United States Patent
Arai et al.

(10) Patent No.: US 9,024,942 B2
(45) Date of Patent: May 5, 2015

(54) 3D POINTER GENERATION DEVICE AND 3D POINTER GENERATION METHOD

(75) Inventors: Hideki Arai, Kanagawa (JP); Nobutane Chiba, Kanagawa (JP); Kazuya Saito, Kanagawa (JP)

(73) Assignee: Sony Corporation, Tokyo (JP)

(*) Notice: Subject to any disclaimer, the term of this patent is extended or adjusted under 35 U.S.C. 154(b) by 535 days.

(21) Appl. No.: 13/371,801

(22) Filed: Feb. 13, 2012

(65) Prior Publication Data

US 2012/0212482 A1    Aug. 23, 2012

(30) Foreign Application Priority Data

Feb. 18, 2011    (JP) .................................. 2011-033640

(51) Int. Cl.
*G06T 15/00* (2011.01)
*G06F 3/0481* (2013.01)
*H04N 13/00* (2006.01)

(52) U.S. Cl.
CPC ........ *G06F 3/04815* (2013.01); *H04N 13/0022* (2013.01)

(58) Field of Classification Search
CPC . G06F 3/04815; H04N 13/00; H04N 13/0022
See application file for complete search history.

(56) References Cited

U.S. PATENT DOCUMENTS

| 5,162,779 A * | 11/1992 | Lumelsky et al. ............ 345/419 |
| 2005/0117215 A1 * | 6/2005 | Lange .......................... 359/462 |
| 2010/0201623 A1 * | 8/2010 | Engel et al. ................... 345/161 |

FOREIGN PATENT DOCUMENTS

| JP | 06-027919 A | 2/1994 |
| WO | WO 2004/114108 | 12/2004 |

* cited by examiner

*Primary Examiner* — Kee M Tung
*Assistant Examiner* — Frank Chen
(74) *Attorney, Agent, or Firm* — Wolf, Greenfield & Sacks, P.C.

(57) ABSTRACT

An apparatus and method for generating a stereoscopic pointer. Position information designates a position of the stereoscopic pointer, including the depth direction of the stereoscopic pointer. Horizontal pointer position signals are generated based on the position information. The horizontal position of the pointer is set in left and right channels to a horizontal position shifted so as to correspond to a parallax of the position of the stereoscopic pointer in the depth direction. The stereoscopic pointer is displayed based on the horizontal pointer position signal.

16 Claims, 11 Drawing Sheets

VIRTUAL POSITION-BASED PROCESSING EXAMPLE (EXAMPLE 1)

VIRTUAL POSITION-BASED PROCESSING EXAMPLE (EXAMPLE 2)

EXAMPLE IN WHICH POINTER IS DISPLAYED ON THE REAR SIDE

EXAMPLE IN WHICH POINTER IS DISPLAYED ON THE FRONT SIDE

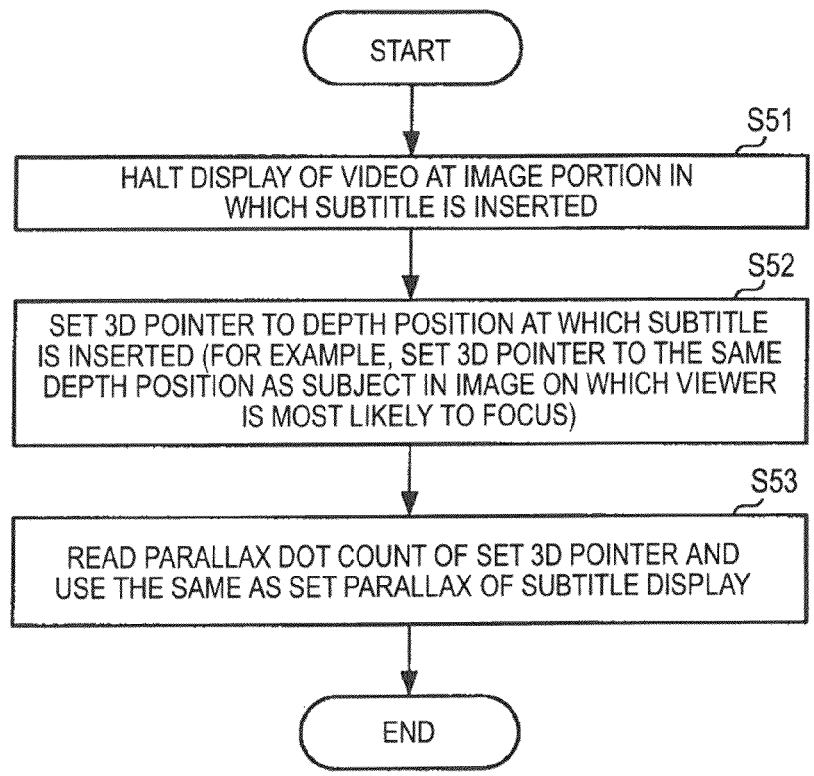
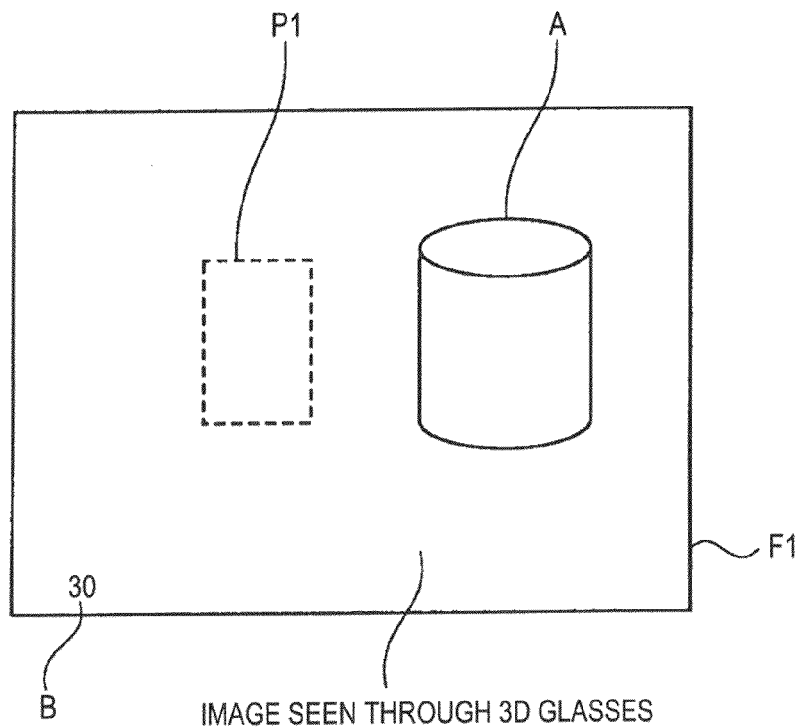

3D POINTER GENERATION DEVICE AND 3D POINTER GENERATION METHOD

FIELD

The present disclosure relates to a 3D pointer generation device and a 3D pointer generation method for displaying a pointer at an optional position within a 3D image which is displayed stereoscopically.

BACKGROUND

When displaying or editing video contents such as a movie or a still image, a pointer is sometimes displayed at an optional position within a displayed image based on an instruction through the operator's operation. For example, when displaying a movie capturing a certain subject, a mark such as an arrow is displayed near the subject as the pointer in order to attach an index or the like to the subject.

As an image display technique, there is a technique of displaying a stereoscopic image by displaying left and right-eye images simultaneously or alternately. Although the technique of displaying a stereoscopic image is already used, with recent improvement in the image processing technique, video apparatuses for capturing and displaying stereoscopic images have been widespread. In the following description of this specification, an image which is displayed stereoscopically will be referred to as a 3D image.

Even when displaying a 3D image, an optional position within the 3D image can be designated by a pointer by displaying the pointer such as an arrow so as to be superimposed on the 3D image.

WO 2004-114108 discloses a technique of displaying a pointer indicating a subject within a 3D image so as to be movable not only on a 2-dimensional plane of the screen but also in the depth direction.

SUMMARY

In the technique disclosed in WO 2004-114108, the amount of protrusion or depression of a pointer is set so as to adjust the display state of the pointer in the depth direction of the 3D image. Thus, in the technique disclosed in WO 2004-114108, the position of the pointer within the 3D image is adjusted so as to be on the front or rear side of a spatial coordinate position at which the parallax between the left and right-eye images becomes 0. Thus, it is necessary to know the spatial coordinate position at which the parallax between the left and right-eye images becomes 0.

However, even when spatial coordinate data are present in a 3D image like an animation image created by computer graphic processing, for example, data like spatial coordinates of a subject within the screen are not present in a 3D image obtained by capturing an actual scene with a camera. Thus, in a general 3D image, it is difficult to set and display a pointer indicating a subject on a screen in such a way that the coordinate thereof is designated.

It is therefor desirable to provide a technique of enabling a pointer such as a specific mark to be displayed in an optional stereoscopic space of a 3D image.

One embodiment of the present disclosure is directed to a method and apparatus for generating a stereoscopic pointer in which position information designates a position of the stereoscopic pointer. The position information includes depth direction of said stereoscopic pointer.

Horizontal pointer position signals are generated based on the position information. The horizontal position of the pointer is set in left and right channels to a horizontal position shifted so as to correspond to a parallax of the position of the stereoscopic pointer in the depth direction based on the depth direction of the position information. A display control unit causes the display of the stereoscopic pointer based on the horizontal pointer position signal.

According to the embodiment of the present disclosure, it is possible to display a pointer indicating a specific mark within an image displayed stereoscopically at an optional depth position on a virtual space based on an operation input.

BRIEF DESCRIPTION OF THE DRAWINGS

FIG. 10 is a flowchart showing a subtitle display position setting process according to an embodiment of the present disclosure.

FIG. 11 is a diagram illustrating an example of a display state according to an embodiment of the present disclosure.

DETAILED DESCRIPTION

Hereinafter, preferred embodiments of the present disclosure will be described in the following order.

1. Overall Device Configuration Example (FIG. 1)
2. Detailed Example of Signal Processing Configuration of Device (FIG. 2)
3. Description of Display Position Setting Process (FIGS. 3 to 6)
4. Example of Signal Processing State (FIGS. 7A to 7I)
5. Description of Setting State of Display Position in Stereoscopic Direction (FIGS. 8 to 9B)
6. Application Example of 3D Pointer to Subtitle Display Position (FIG. 10)

Figure 12:
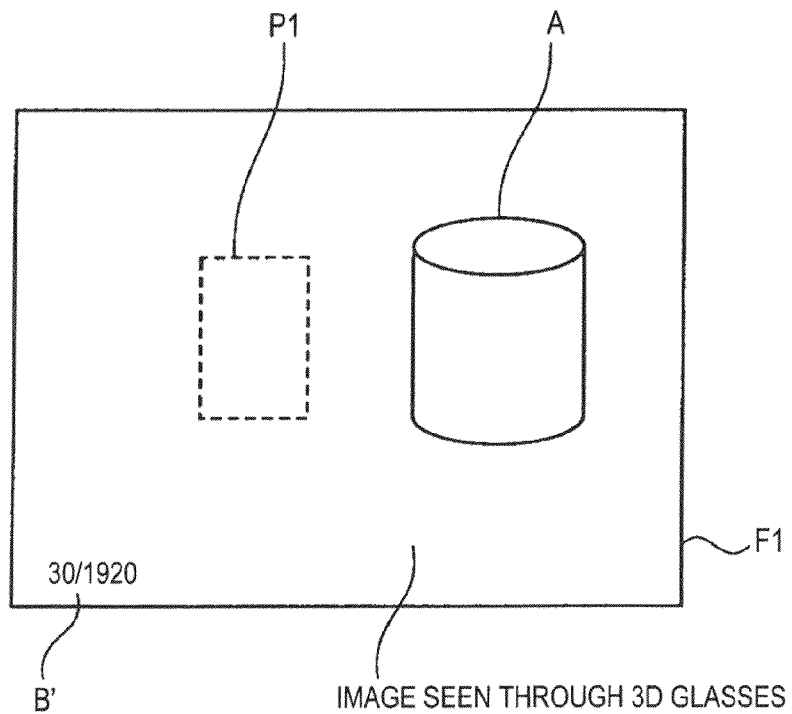
FIG. 12 is a diagram illustrating another example of a display state according to an embodiment of the present disclosure.
Figure 13:
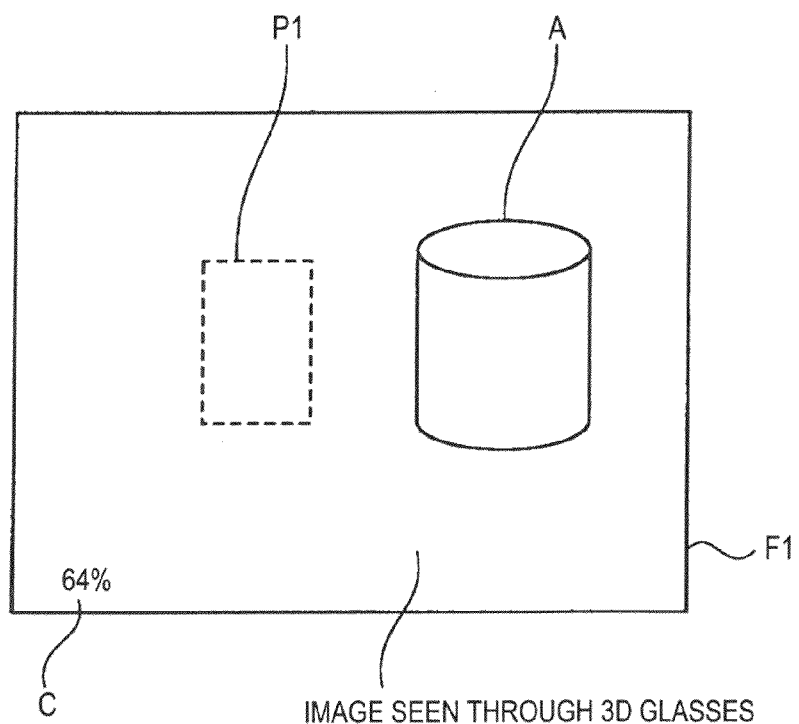
FIG. 13 is a diagram illustrating a further example of a display state according to an embodiment of the present disclosure.

7. Example of Displaying Parallax Dot Count of 3D Pointer (FIGS. 11, 12, and 13)

8. Modified Example

[1. Overall Device Configuration Example]

Figure 1:
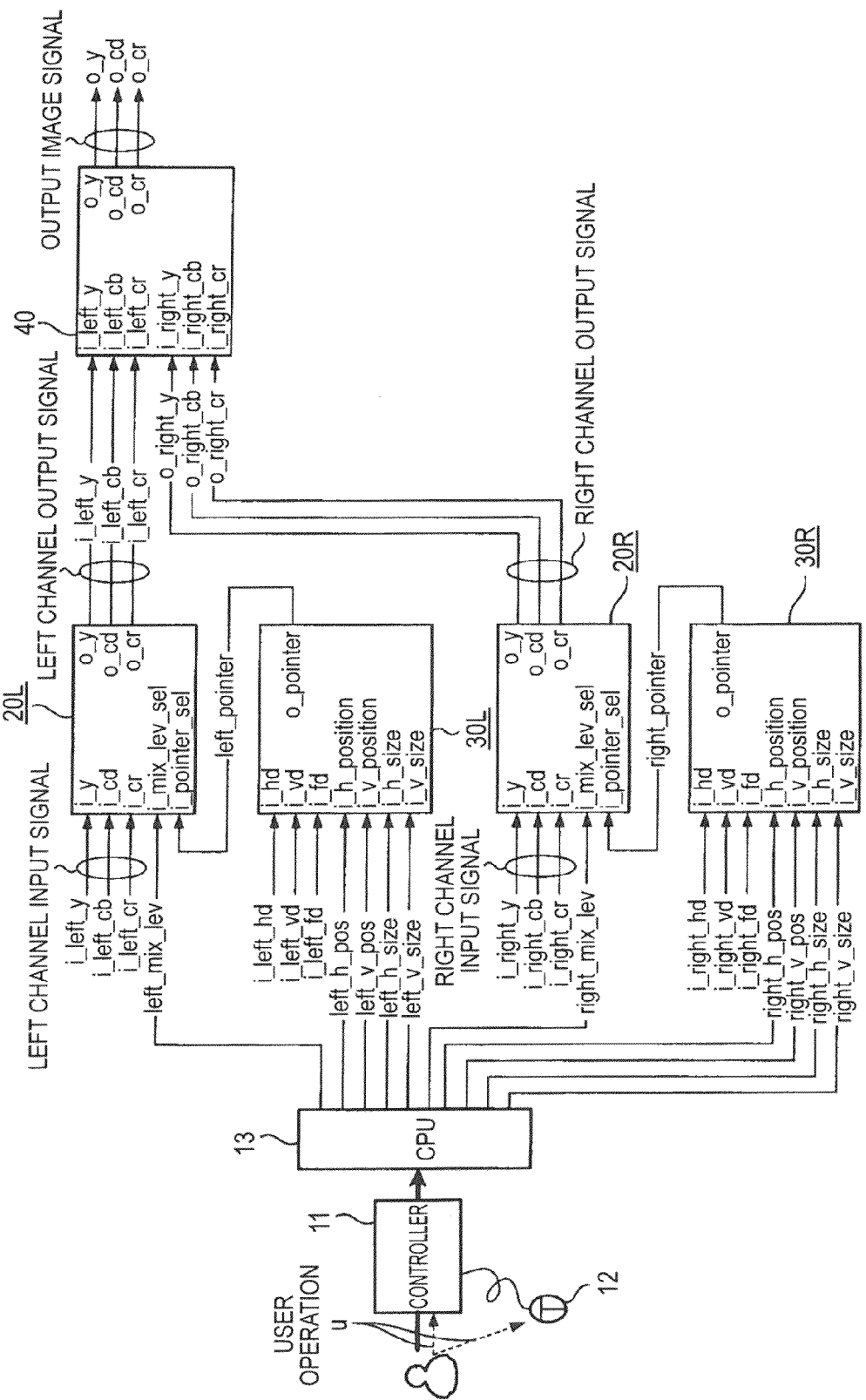
FIG. 1 is a block diagram showing a configuration of a device according to an embodiment of the present disclosure.

FIG. 1 is a diagram showing an overall configuration of an image signal processing device as a 3D pointer generation device according to an embodiment of the present disclosure.

As shown in FIG. 1, the image signal processing device includes a controller 11 that receives an operation u from a user who is an operator. The controller 11 sends an instruction on the display position of a pointer to a central control unit 13 (hereinafter referred to as a CPU) which is a control unit. The controller 11 is connected to an input unit such as a keyboard that receives the user operation u. In this example, a mouse 12 which is a pointing device is connected as an input unit. The mouse 12 used in the present embodiment includes a scroll button and allows the user to designate the position on a 2-dimensional area by moving the mouse 12 on a surface such as a desk.

The scroll button of the mouse 12 can be operated in two modes of operation: one is to scroll toward the front side as viewed from the user who operates the scroll button, and the other is to scroll toward the rear side. In the case of the present embodiment, the position of the pointer displayed on a screen in the horizontal and vertical directions within the screen is designated by the instruction on the position on a 2-dimensional area through the mouse 12. Moreover, the position of the pointer in the depth direction of a virtual space displayed in 3D is designated by the instruction through the scroll button. A specific example of giving the instruction on the pointer position will be described later.

In the present embodiment, an image signal (video signal) processed by the image signal processing device is an image signal for stereoscopic display (3D display) and includes a left-channel image signal to be viewed with the left eye and a right-channel image signal to be viewed with the right eye. The left-channel image signal and the right-channel image signal are supplied and input from another reproducing device, a receiving device, a video camera, or the like, which is not shown. However, the image signal input to the left and right channels may be a left-channel image signal and a right-channel image signal which are generated in the image signal processing device.

The image signal processing device includes two signal processing systems: one is for processing the left-channel image signal, and the other is for processing the right-channel image signal. The left-channel image signal and the right-channel image signal are combined together in the last stage and output and supplied to a display device. However, there are various processing methods for realizing 3D display with a display device. For example, the left-channel image signal and the right-channel image signal may be input as separate image signals. In this case, the process of combining the left-channel image signal and the right-channel image signal may not be performed.

The pointer of which the instruction on the display position is sent from the controller 11 to the CPU 13 is also a pointer for realizing 3D display with the display device. In the following description, the pointer for realizing 3D display will be referred to as a 3D pointer.

The controller 11 sends an instruction on the position in the horizontal direction (lateral direction) and the vertical direction (longitudinal direction) within a display screen to the CPU 13 as the position of the 3D pointer and also sends an instruction on the position in the depth direction of a virtual space displayed in 3D to the CPU 13.

For example, the position in the horizontal and vertical directions within the display screen is designated by the user performing an operation of designating the position on a 2-dimensional area using the mouse 12. Similarly, the position in the depth direction of the virtual space is designated by the user's operation on the scroll button of the mouse 12. Specifically, the position on the front side of the virtual space is designated by scrolling the scroll button toward one side (front side), and the position on the rear side of the virtual space is designated by scrolling the scroll button toward the other side (rear side).

Upon receiving the instruction on the position of the 3D pointer from the controller 11, the CPU 13 controls respective processing units so as to display the 3D pointer at the instructed position.

A left pointer generation unit 30L and a right pointer generation unit 30R are provided as a pointer generation unit that performs a pointer generation process of generating a pointer display signal for displaying the pointer.

The left pointer generation unit 30L generates a left channel pointer display signal of the size and position as instructed from the CPU 13. The generated left channel pointer display signal (pointer image) is supplied to a left channel mixing unit 20L that performs a left channel mixing process and is mixed with a left channel input image signal.

The right pointer generation unit 30R generates a right channel pointer display signal of the size and position as instructed from the CPU 13. The generated right channel pointer display signal (pointer image) is supplied to a right channel mixing unit 20R that performs a right channel mixing process and is mixed with a right channel input image signal.

Examples of a specific control signal and an image signal shown in FIG. 1 will be described.

A left horizontal position signal [left_h_pos], a left vertical position signal [left_v_pos], a left horizontal size signal [left_h_size], and a left vertical size signal [left_v_size] are supplied from the CPU 13 to the left pointer generation unit 30L. The left horizontal position signal [left_h_pos] and the left vertical position signal [left_v_pos] are signals designating the position of the displayed pointer in the horizontal and vertical directions of an image. The left horizontal size signal [left_h_size] and the left vertical size signal [left_v_size] are signals designating the size (display width) of a mark used as the displayed pointer in the horizontal and vertical directions.

A right horizontal position signal [right_h_pos], right vertical position signal [right_v_pos], a right horizontal size signal [right_h_size], and a right vertical size signal [right_v_size] are supplied from the CPU 13 to the right pointer generation unit 30R. The right horizontal position signal [right_h_pos] and the right vertical position signal [right_v_pos] are signals designating the position of the displayed pointer in the horizontal and vertical directions of an image. The right horizontal size signal [right_h_size] and the right vertical size signal [right_v_size] are signals designating the size (display width) of a mark used as the displayed pointer in the horizontal and vertical directions.

In addition, a horizontal drive signal [i_left_hd], a vertical drive signal [i_left_vd], and a frame signal [i_left_fd], which are synchronization signal components of the left-channel image signal, are supplied to the left pointer generation unit 30L. Moreover, in the left pointer generation unit 30L, a left channel pointer display signal [left_pointer] for displaying a pointer of the instructed position and size is generated in synchronization with the synchronization signal of the left-channel image signal.

Similarly, a horizontal drive signal [i_right_hd], a vertical drive signal [i_right_vd], and a frame signal [i_right_fd], which are synchronization signal components of the right-channel image signal, are supplied to the right pointer generation unit 30R. Moreover, in the right pointer generation unit 30R, a right channel pointer display signal [right_pointer] for displaying a pointer of the instructed position and size is generated in synchronization with the synchronization signal of the right-channel image signal.

By supplying these respective signals from the CPU 13 to the left pointer generation unit 30L and the right pointer generation unit 30R, the pointer display signals generated by the respective pointer generation units 30L and 30R become signals of the display position and size as instructed. Here, the CPU 13 sets the positions of the pointer of the left and right channels in the horizontal direction to a horizontal position that is shifted so as to correspond to a parallax of the position in the depth direction of the virtual space as instructed by the CPU 13. A detailed state of the process of setting the pointer position to a horizontal position shifted so as to correspond to the parallax of the instructed position will be described later.

The left channel mixing unit 20L mixes the pointer image with the input left-channel image signal based on the position and size as instructed by the left channel pointer display signal [left_pointer].

Similarly, the right channel mixing unit 20R mixes the pointer image with the input right-channel image signal based on the position and size as instructed by the right channel pointer display signal [right_pointer].

In the embodiment of the present disclosure, the input image signals supplied to the mixing units 20L and 20R are signals in which luminance and chromaticity signals are separated. That is, an input luminance signal [i_left_y], an input first color difference signal [i_left_cb], and an input second color difference signal [i_left_cr] for the left channel are supplied to the left channel mixing unit 20L. The pointer image of the position and size instructed by the pointer display signal is mixed with the left channel image signal in which the luminance and chromaticity signals are separated, and a mixed image signal is output from the mixing unit 20L. That is, as shown in FIG. 1, an output luminance signal [o_left_y], an output first color difference signal [o_left_cb], and an output second color difference signal [o_left_cr] are output from the mixing unit 20L and supplied to a combination processing unit 40.

Similarly, an input luminance signal [i_right_y], an input first color difference signal [i_right_cb], and an input second color difference signal [i_right_cr] for the right channel are supplied to the right channel mixing unit 20R. The pointer image of the position and size instructed by the pointer display signal is mixed with the right channel image signal in which the luminance and chromaticity signals are separated, and a mixed image signal is output from the mixing unit 20R. That is, as shown in FIG. 1, an output luminance signal [o_right_y], an output first color difference signal [o_right_cb], and an output second color difference signal [o_right_cr] are output from the mixing unit 20R and supplied to the combination processing unit 40.

The combination processing unit 40 combines the left channel image signal and the right channel image signal. For example, the left-channel image signal and the right-channel image signal are alternatively arranged every frame to form an image signal. The image signal combined by the combination processing unit 40 is supplied to a display device not shown. In the example of FIG. 1, a combined luminance signal [o_y], a combined first color difference signal [o_cb], and a combined second color difference signal [o_cr] are output from the combination processing unit 40 as the combined image signal.

As described above, when a display device that realizes 3D display inputs image signals of the respective channels independently, the combining process by the combination processing unit 40 may not be performed.

[2. Detailed Example of Signal Processing Configuration of Device]

Next, a detailed configuration of the mixing units 20L and 20R and the pointer generation units 30L and 30R of the respective channels will be described with reference to FIG. 2.

The left channel mixing unit 20L and the left pointer generation unit 30L basically have the same configuration as the right channel mixing unit 20R and the right pointer generation unit 30R, respectively. In FIG. 2, the configuration of only one channel is shown. Moreover, FIG. 2 shows a generalized configuration of the left and right channels, in which symbols [left] and [right] representing the left and right channels are omitted from the symbols of the respective signals shown in FIG. 1.

The horizontal drive signal [i_hd] supplied to the pointer generation units 30L and 30R is supplied to a horizontal dot counter 312 through a buffer amplifier 311, whereby a dot count signal [h_count] representing a horizontal dot count (horizontal pixel count) of the image signal is obtained. The dot count signal [h_count] obtained by the horizontal dot counter 312 is supplied to an input A of an arithmetic unit 314.

Moreover, the horizontal drive signal [i_hd] supplied to the pointer generation units 30L and 30R is supplied to a horizontal edge detector 313, whereby a horizontal edge is detected. A detection signal [hdn] as the result of the detection by the horizontal edge detector 313 is supplied to a line counter 322. A vertical drive signal [i_vd] supplied to the pointer generation units 30L and 30R is supplied to the line counter 322 through the buffer amplifier 321. The line counter 322 counts the horizontal line count based on the detection signal of a horizontal edge while being reset by a vertical drive signal and supplies a line count signal [v_count] to an input A of an arithmetic unit 345.

Moreover, the vertical drive signal [i_vd] supplied to the pointer generation units 30L and 30R is supplied to a vertical edge detector 323, whereby vertical edge rising and falling detection signals [v_dp] and [v_dn] are obtained. Moreover, the obtained detection signals are supplied to a progressive determiner 324. Moreover, the frame signal [i_fd] supplied to the pointer generation units 30L and 30R is supplied to the progressive determiner 324 through a buffer amplifier 325.

The progressive determiner 324 determines whether or not the input image signal is a progressive signal based on the vertical edge detection signals and the frame signal and outputs a determination result signal [prog]. The detection result signal [prog] is used as a conversion control signal for switches 341 and 343.

Moreover, the horizontal position signal [i_h_pos], the vertical position signal [i_v_pos], the horizontal size signal [i_h_size], and the vertical size signal [i_v_size] supplied from the CPU 13 are supplied to buffer amplifiers 331, 332, 333, and 334, respectively.

The horizontal position signal [i_h_pos] output by the buffer amplifier 331 is supplied to an input B of the arithmetic unit 314.

The vertical position signal [i_v_pos] output by the buffer amplifier 332 is directly supplied to one contact of the switch 341 and is supplied to the other contact of the switch 341 through a ½ line delay circuit 342. The switch 341 selects a signal obtained at an appropriate contact based on the determination result signal [prog] output by the progressive determiner 324 and supplies the selected vertical position signal [i_v_pos] to an input B of the arithmetic unit 345.

The horizontal size signal [i_h_size] output by the buffer amplifier 333 is supplied to an input C of the arithmetic unit 314.

The vertical size signal [i_v_size] output by the buffer amplifier 334 is directly supplied to one contact of the switch 343 and is supplied to the other contact of the switch 343 through a ½ line delay circuit 344. The switch 343 selects a signal obtained at an appropriate contact based on the determination result signal [prog] output by the progressive determiner 324 and supplies the selected vertical size signal [i_v_size] to an input C of the arithmetic unit 345.

The arithmetic unit 314 performs an arithmetic process on the signals supplied to the inputs A, B, and C to thereby obtain a horizontal position signal [h_area] for displaying the pointer. As an example of the arithmetic process performed by the arithmetic unit 314, when a relation of "A≥B" and "A<(B+C)" is satisfied with respect to the inputs A, B, and C, the horizontal position signal [h_area] of the high level H is obtained.

The arithmetic unit 345 performs an arithmetic process on the signals supplied to the inputs A, B, and C to thereby obtain a vertical position signal [v_area] for displaying the pointer. As an example of the arithmetic process performed by the arithmetic unit 345, when a relation of "A≥B" and "A<(B+C)" is satisfied with respect to the inputs A, B, and C, the vertical position signal [v_area] of the high level H is obtained.

The pointer horizontal position signal [h_area] output by the arithmetic unit 314 and the pointer vertical position signal [v_area] output by the arithmetic unit 345 are supplied to an arithmetic unit 315. When both signals are in the high level, an output signal of the high level is obtained. The output signal of the arithmetic unit 315 is output from the respective pointer generation units 30L and 30R as a signal [o_pointer] representing the pointer position.

The signal [o_pointer] representing the pointer position is supplied to the mixing units 20L and 20R of the respective channels as a pointer selection signal [i_pointer_sel]. The pointer selection signal [i_pointer_sel] controls the switching of changeover switches 214, 224, and 234 from the input image signal to the image signal of the pointer.

The luminance signal [i_y], the input first color difference signal [i_cb], and the input second color difference signal [i_cr] are supplied to the mixing units 20L and 20R as an input image signal. The respective signals are supplied to a group of input terminals of the switches 214, 224, and 234 and inputs B of adders 212, 222, and 232 through delay adjustment circuits 211, 222, and 231, respectively.

The adders 212, 222, and 232 performs a process of adding input image signals in order to display the pointer as semi-transparent.

A luminance level signal of the pointer is supplied to an input A of the adder 212. Moreover, the adder 212 adds the luminance level signal of the pointer supplied to the input A and the luminance signal of the input image signal supplied to an input B and adjusts the signal level of the added signal by ½. This addition process corresponds to a process of displaying the pointer as semi-transparent. The signal of which the signal level is added by the adder 212 and adjusted by ½ is supplied to one input terminal of the switch 213. The luminance level signal of the pointer is supplied to the other input terminal of the switch 213, and the display mode of the pointer is selected by the switching of the switch 213 between a mode of displaying the same to be opaque and a mode of displaying the same as semi-transparent. The switching of the switch 213 is controlled by a pointer display setting signal [i_mix_sel] in synchronization with other switches 223 and 233 described later. The signal selected by the switch 213 is supplied to the other input terminal of the switch 214.

The switch 214 selects the pointer display signal output by the switch 213 when the pointer selection signal [i_pointer_sel] is in the high level and outputs the input luminance signal when the pointer selection signal is in the low level.

A first color difference level signal of the pointer is supplied to an input A of the adder 222. Moreover, the adder 222 adds the first color difference level signal of the pointer supplied to the input A and the first color difference signal of the input image signal supplied to the input B and adjusts the signal level of the added signal by ½. The signal of which the signal level is added by the adder 222 and adjusted by ½ is supplied to one input terminal of the switch 223. The first color difference level signal of the pointer is supplied to the other input terminal of the switch 223, and the display mode of the pointer is selected by the switching of the switch 223 between a mode of displaying the same to be opaque and a mode of displaying the same as semi-transparent. The signal selected by the switch 223 is supplied to the other input terminal of the switch 224.

The switch 224 selects the pointer display signal output by the switch 223 when the pointer selection signal [i_pointer_sel] is in the high level and outputs the input first color difference signal when the pointer selection signal is in the low level.

A second color difference level signal of the pointer is supplied to an input A of the adder 232. Moreover, the adder 232 adds the second color difference level signal of the pointer supplied to the input A and the second color difference signal of the input image signal supplied to the input B and adjusts the signal level of the added signal by ½. The signal of which the signal level is added by the adder 232 and adjusted by ½ is supplied to one input terminal of the switch 233. The second color difference level signal of the pointer is supplied to the other input terminal of the switch 233, and the display mode of the pointer is selected by the switching of the switch 233 between a mode of displaying the same to be opaque and a mode of displaying the same as semi-transparent. The signal selected by the switch 233 is supplied to the other input terminal of the switch 234.

The switch 234 selects the pointer display signal output by the switch 233 when the pointer selection signal [i_pointer_sel] is in the high level and outputs the input second color difference signal when the pointer selection signal is in the low level.

[3. Description of Display Position Setting Process]

Next, a process when displaying the pointer on a screen in 3D will be described with reference to the flowcharts of FIGS. 3 to 6. The pointer display process shown in the flowcharts of FIGS. 3 to 6 is executed by the control of the CPU 13 shown in FIG. 1.

First, an overall flow of the process of displaying the pointer on the screen in 3D will be described with reference to the flowchart of FIG. 3. The CPU 13 determines whether or not a pointer display instruction through a user operation or the like is received from the controller 11 (step S11). When the pointer display instruction is not received in step S11, a standby is performed until the display instruction is received.

When the pointer display instruction is received in step S11, the CPU 13 determines the pointer display position in the horizontal and vertical directions of the screen based on an instruction through the operation of the mouse 12 which is a pointing device connected to the controller 11 (step S12). The display size and state of the pointer is determined in accordance with a preset pointer display mode, for example.

Furthermore, the CPU 13 checks an operation state of the scroll button of the mouse 12 connected to the controller 11, and based on the operation state, determines the position of the pointer in the depth direction of a virtual space formed in 3D display when the pointer is displayed in 3D (step S13). Specifically, for example, when the scroll button is scrolled toward the front side, it is determined that there is an instruction to move the position of the pointer in the depth direction of the virtual space to a front position. Moreover, when the scroll button is scrolled toward the rear side, it is determined that there is an instruction to move the pointer position to a rear position.

Moreover, the CPU 13 sets the amount of shift in the horizontal direction of the left and right channel images of the displayed pointer based on the instruction on the position in the depth direction of the virtual space (step S14). The CPU 13 performs a control process which involves determining the display position of the pointer in the horizontal and vertical directions within the images of the respective channels based on the horizontal shift amount and moving the pointer to the corresponding display position.

When it is determined in step S13 that no operation is performed on the scroll button, the pointer display position in the left channel image is set to be the same as the pointer display position in the right channel image. In the following description, a position in which the display position on the screen is the same between the left and right channel images will be referred to as a reference position or a reference plane.

When the above processes have been performed, the flow returns to step S11, and the display position of the pointer is changed based on the operation of the mouse 12 as needed.

Next, a process of restricting the position in the horizontal and vertical directions of the screen when the display position of the pointer is set based on the operation of the mouse 12 will be described with reference to the flowchart of FIG. 4.

In the case of the present embodiment, although the display position of the pointer in the horizontal and vertical directions of the screen is basically restricted to be within the screen, the display position is further restricted to be within a range where 3D display can be realized.

That is, when performing 3D display using the left channel image and the right channel image, an object needs to be within a displayable range of the respective images. However, since an image of only one channel is displayed at the left and right edges of the screen, the object is not displayed stereoscopically.

Figure 4:
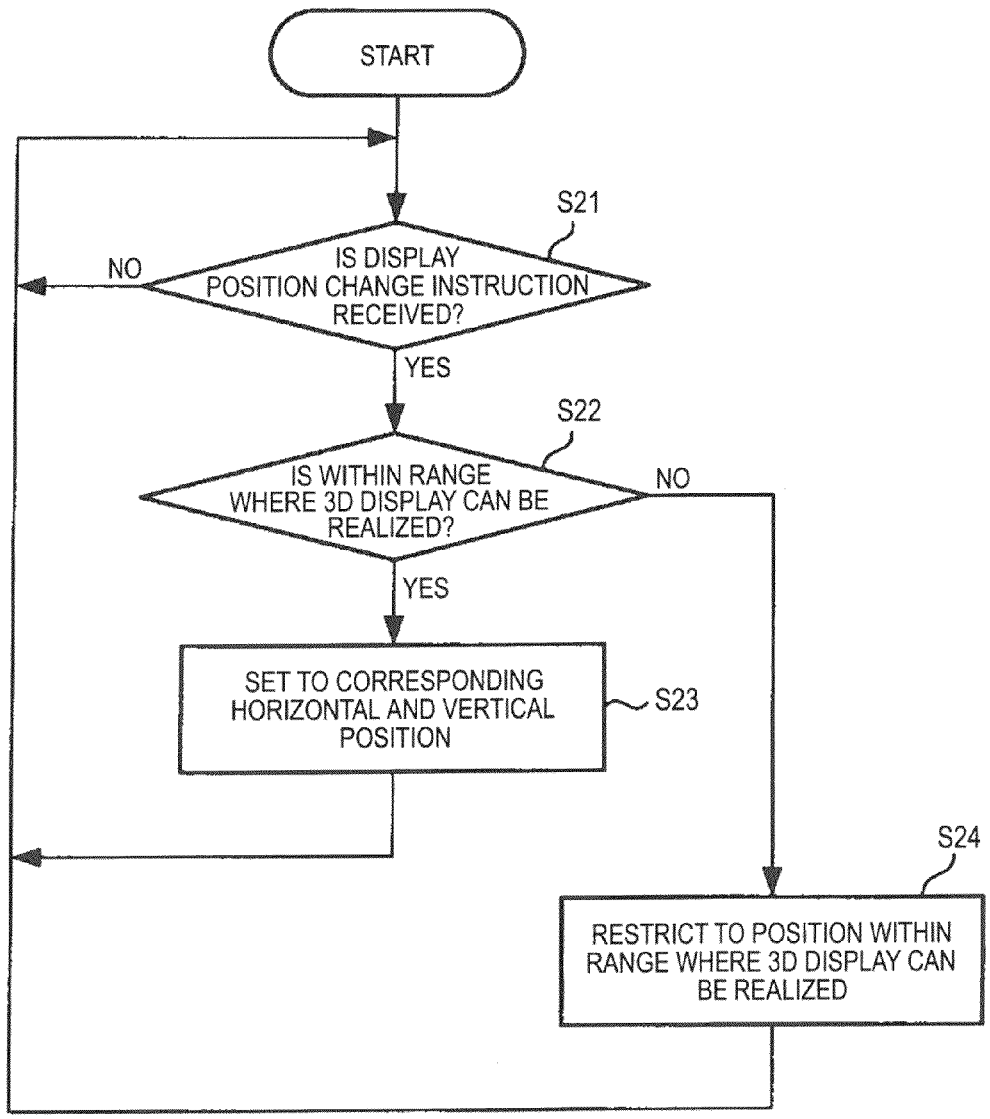
FIG. 4 is a flowchart showing an example of a process of setting a pointer display position in the horizontal and vertical directions according to an embodiment of the present disclosure.

Thus, as shown in the flowchart of FIG. 4, the CPU 13 determines whether or not an instruction to change the pointer display position is received (step S21). When an instruction to change the pointer display position is not received, a standby is performed until an instruction to change the pointer display position is received. When it is determined in step S21 that the instruction to change the display position is received, it is determined whether or not the changed position is surely within a range where stereoscopic display can be realized (step S22). Here, the range where stereoscopic display can be realized means a range excluding the left and right edges of the screen as described above.

Figure 3:
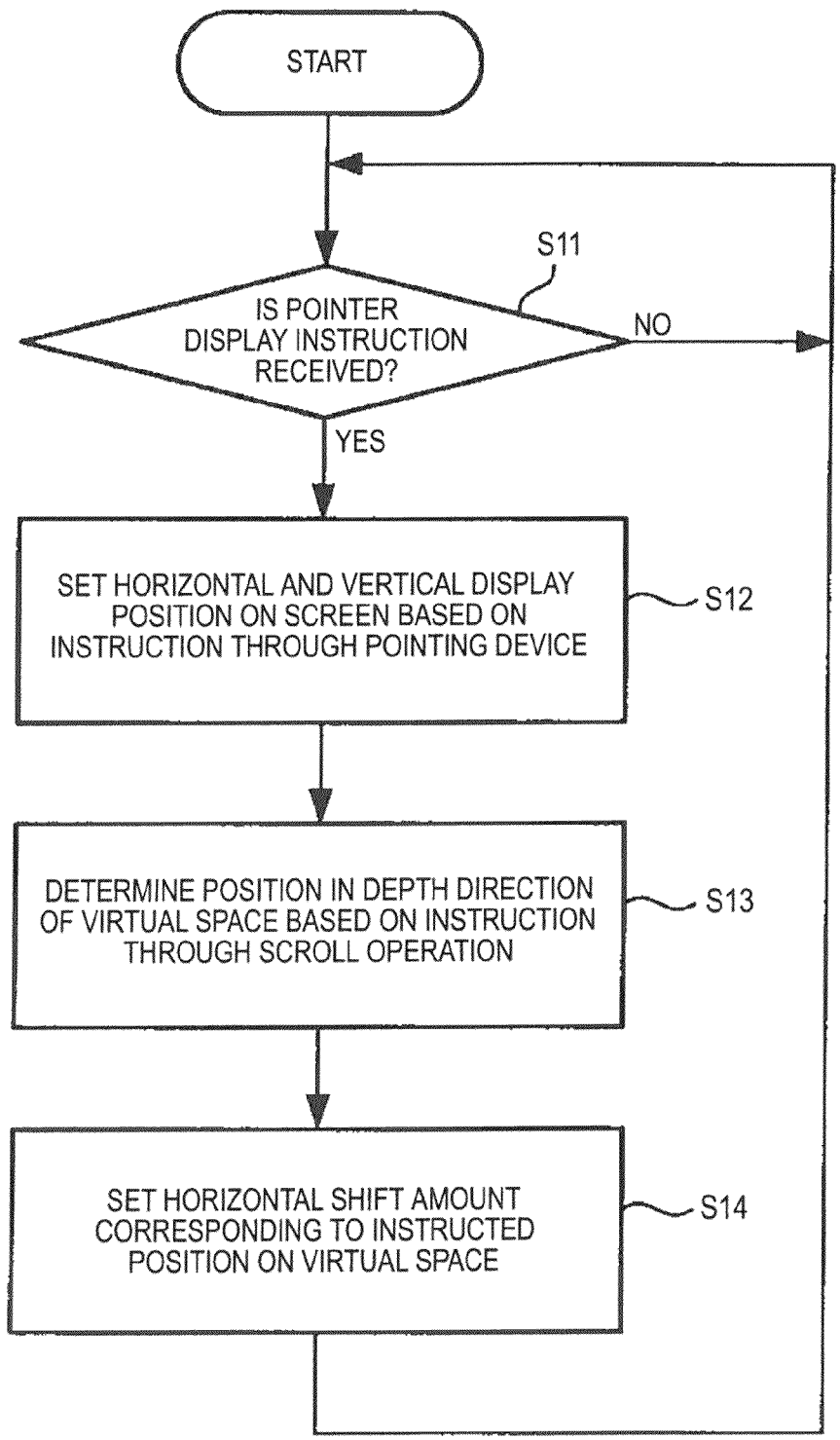
FIG. 3 is a flowchart showing an example of a pointer display process according to an embodiment of the present disclosure.

When it is determined in step S22 that the instructed pointer display position is within the range excluding the left and right edges of the screen, the display position is set by the process shown in the flowchart of FIG. 3 so that the pointer is displayed at the instructed position (step S23).

Moreover, when it is determined in step S22 that the instructed pointer display position is at a position of the left and right edges of the screen where it is likely that 3D display may not be realized, the pointer display position is restricted to a position within the range (namely, on the inner side of the left and right edges) where 3D display can be realized (step S24).

After performing the processes of steps S23 and S24, the flow returns to step S21.

By performing the processes of the flowchart of FIG. 4, the pointer is always displayed at a depth position within the virtual space as set. In addition, the process of restricting the display position as shown in the flowchart of FIG. 3 is realized when the pointer horizontal position signal [i_h_pos] supplied to the buffer amplifier 331 shown in FIG. 2, for example is generated as the corresponding position signal. The process of generating the pointer horizontal position signal as the corresponding position signal is performed by the control of the CPU 13, for example.

Next, a process of setting the display color of the pointer when displaying the pointer in an image by the control of the CPU 13 will be described.

The display color of the pointer can be freely set by the user setting, for example. Moreover, when the depth within the virtual space is set by the 3D display process, the display color of the pointer may be changed only when the depth position is at a reference position, namely when the display position on the screen is the same between the left and right channel images or near the reference position.

Figure 5:
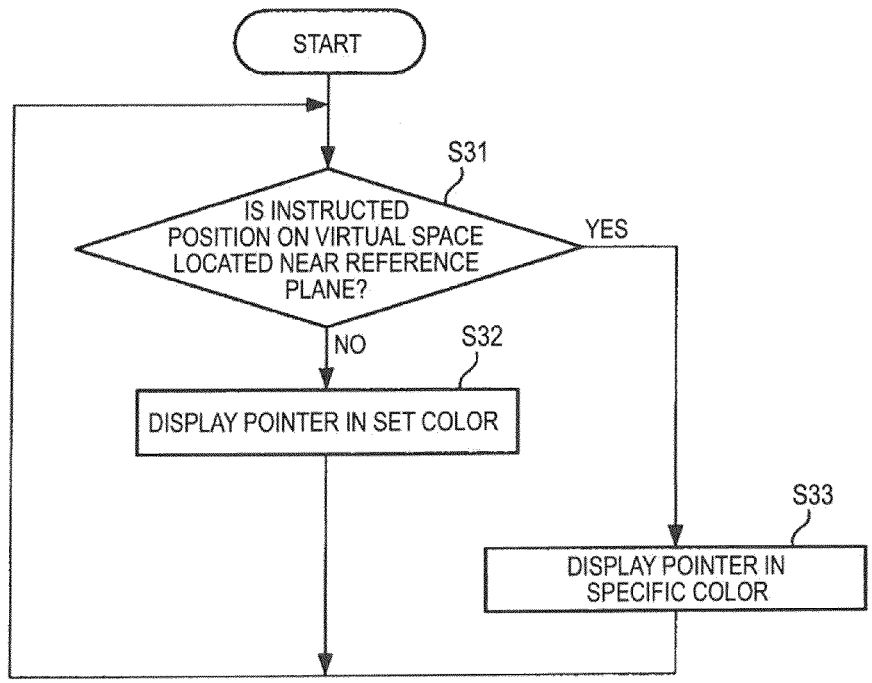
FIG. 5 is a flowchart showing a first example of virtual position-based processing according to an embodiment of the present disclosure.

The flowchart of FIG. 5 shows a processing example when the display color of the pointer is changed only when the depth position is at the reference position (reference plane).

First, it is determined whether the position on the virtual space as instructed through the user operation on the scroll button is at the reference position or near the reference position (step S31). When it is determined in step S31 that the instructed position is not at the reference position or near the reference position, namely, when there is a shift of a predetermined amount or more between the display positions of the left and right pointers, the pointer is displayed in a color (or a preset color) determined by the user (step S32). Moreover, when it is determined in step S31 that the position on the virtual space as instructed through the user operation on the scroll button is at the reference position or near the reference position, the pointer is displayed in a specific color different from the color used in step S32 (step S33). After performing the display processes of steps S32 and S33, the flow returns to step S31, and the processes of this flowchart are repeated.

Here, the reference position is the case when the pointer display position is the same between the left and right channel images as described above. Moreover, the position near the reference position is the case when there is a very small difference in display position, for example, of about ±1 pixel or ±several pixels in the horizontal direction.

By performing the processes shown in the flowchart of FIG. 5, the user performing operations can judge whether or not the pointer has reached the reference position in the depth direction based on a change of the pointer color just by operating the scroll button of the mouse 12 while looking at the displayed figure of the pointer itself. Thus, the user can be easily informed of the fact that the pointer has reached the reference position without additionally displaying the virtual position of the pointer on the 3D screen as scales or the like.

Figure 2:
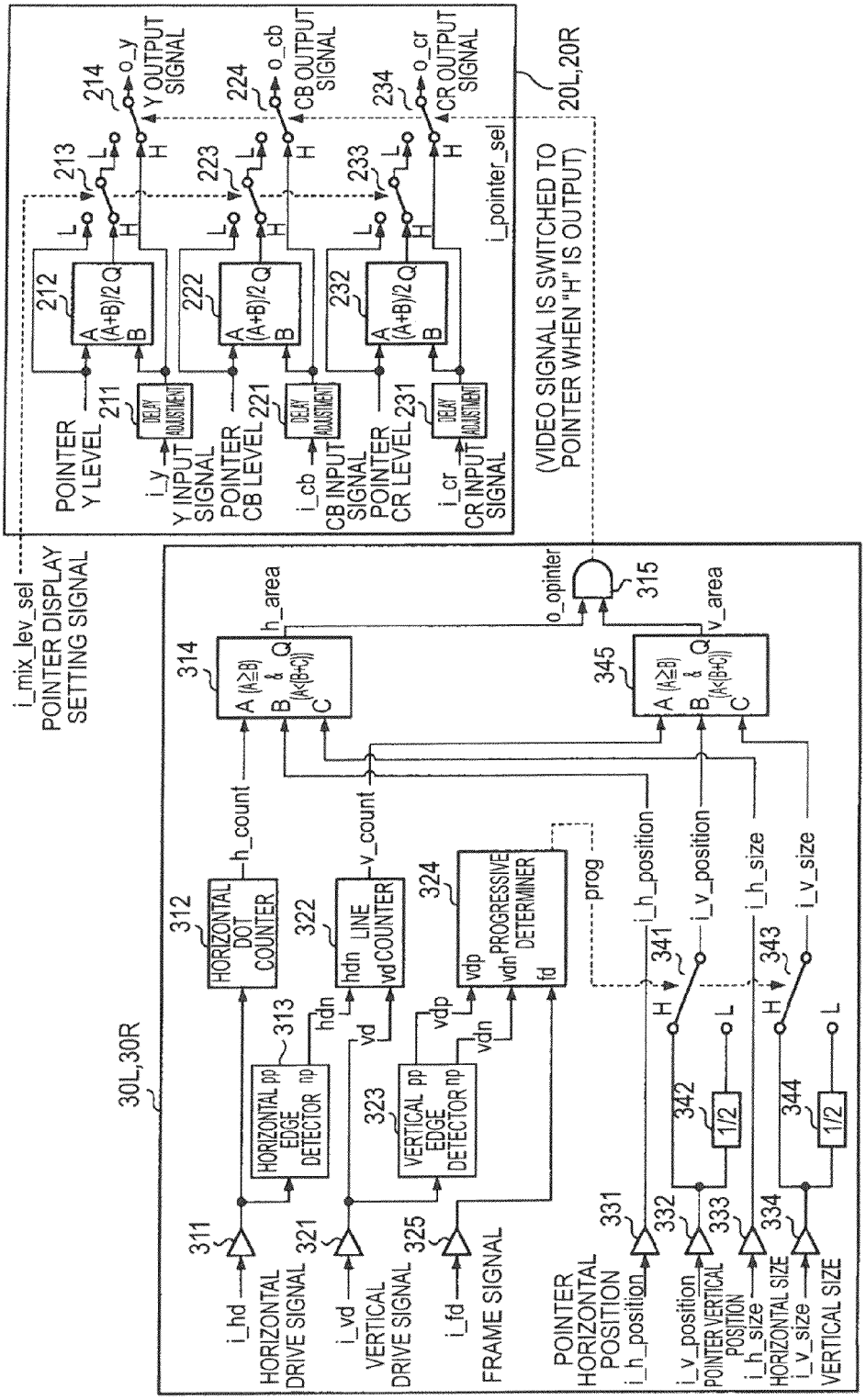
FIG. 2 is a block diagram showing an example of a main part of the device shown in FIG. 1.

The process of setting the display position shown in the flowchart of FIG. 4 is realized when the first color difference level signal and the second color difference level signal of the pointer, supplied to the adders 222 and 232 and the switches 223 and 233 shown in FIG. 2, for example are set to the corresponding color signals. The process of setting the color difference signals to the corresponding color signals is performed by the control of the CPU 13, for example.

Next, a processing example of changing the display state of the pointer depending on whether the pointer is on the front side of the reference position or the rear side thereof when displaying the pointer in an image by the control of the CPU 13 will be described with reference to the flowchart of FIG. 6.

First, it is determined whether the depth position of the pointer set within a virtual space is on the front side of the reference position or the rear side thereof (step S41). When it is determined in step S41 that the depth position is on the rear side of the reference position, the pointer is displayed as a semi-transparent object in a set color (step S42). The process of displaying the pointer as a semi-transparent object corresponds to a process of causing the switches 213, 223, and 233 in the mixing units 20L and 20R in FIG. 2 to select the output sides of the adders 212, 222, and 232, for example. That is, when the respective adders 212, 222, and 232 add the input image signal and the pointer display image signal to output a level-adjusted signal, the pointer is displayed so that an original image at the pointer position is seen through to some extent.

Moreover, when it is determined in step S41 that the depth position is on the front side of the reference position, the pointer is displayed as an opaque object in a set color (step S43). The process of displaying the pointer as an opaque object corresponds to a process of causing the switches 213, 223, and 233 in the mixing units 20L and 20R in FIG. 2 to directly select the input pointer level signal, for example. That is, an original image at the pointer position is concealed.

When it is determined in step S41 that the depth position set within the virtual space is at the reference position, any one of the processes of steps S42 and S43 may be performed. Alternatively, when the depth position is at the reference position (or near the reference position), the pointer may be displayed in another specific color by incorporating the processes of the flowchart of FIG. 5.

Figure 6:
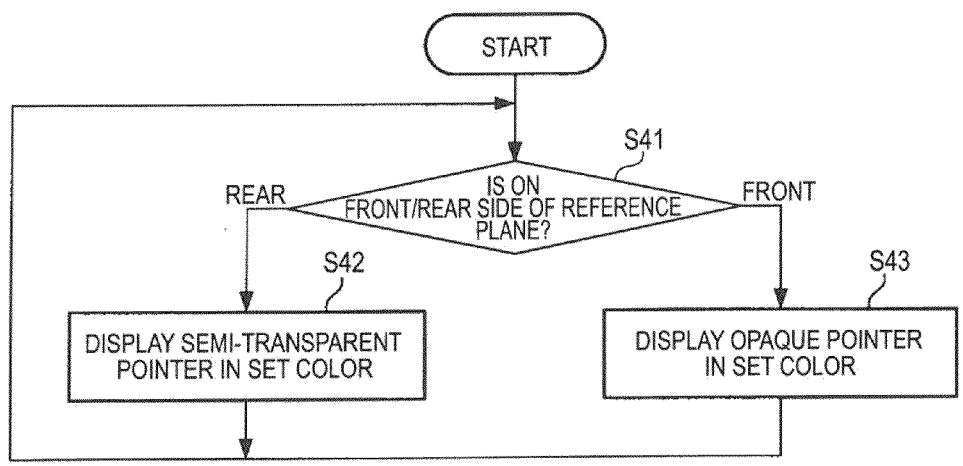
FIG. 6 is a flowchart showing a second example of virtual position-based processing according to an embodiment of the present disclosure.

By performing the processes of the flowchart of FIG. 6, the pointer is appropriately displayed in accordance with the setting state of the depth within the virtual space.

That is, in the present embodiment, the original image to which the pointer is mixed is also an image which is displayed in 3D, and respective objects in the image have an appropriate depth. Here, looking into the arrangement state of respective objects in the depth direction of an image, most objects in the image are highly likely to be located near the reference position, excluding an object disposed particularly on the front or rear side in order to give a stereoscopic sense. Here, a case in which a specific object in the image is disposed near the reference position, and a pointer set to a position on the rear side of the reference position is displayed at the display position of the object to be opaque in a superimposed manner will be considered. In this case, there is a problem in that the image located on the front side of the virtual position of the pointer is concealed by the pointer set to the rear most position.

In contrast, by performing the processes shown in the flowchart of FIG. 6, when the pointer is displayed on the rear side, the original image at the overlapping position is also displayed as semi-transparent. Thus, the possibility of the occurrence of the above-mentioned problem decreases.

Moreover, when the pointer is set to the front position, the image at the position overlapping the pointer display position is highly likely to be located on the rear side of the set position of the pointer. Thus, even when the pointer is displayed to be opaque, the possibility of the occurrence of the above-mentioned problem decreases.

Thus, by performing the display process shown in FIG. 6, favorable display can be realized with small possibility of the above-mentioned problem regardless of the depth position of the pointer in the virtual space.

More favorable display may be realized by incorporating the process of displaying the pointer in a different color when the pointer is at the reference position shown in FIG. 5 and the process of restricting the display at the left and right edges shown in the flowchart of FIG. 4.

In the example of the flowchart of FIG. 6, a specific color is used for the pointer on the front side of the reference position, and a semi-transparent color is used for the pointer on the rear side of the reference position. However, the display color of the pointer may be changed in at least two steps so that a first color is used for the pointer on the front side of the reference position, a second color is used for the pointer on the rear side of the reference position. In this case, the second color for displaying the pointer on the rear side of the reference position may be a relatively thin color so that the pointer does not appear too strong.

[(4. Example of Signal Processing State FIGS. 7A to 7I)]

Next, an example of displaying the pointer with the signal processing configuration shown in FIG. 2 will be described with reference to FIGS. 7A to 7I.

Figure 7:
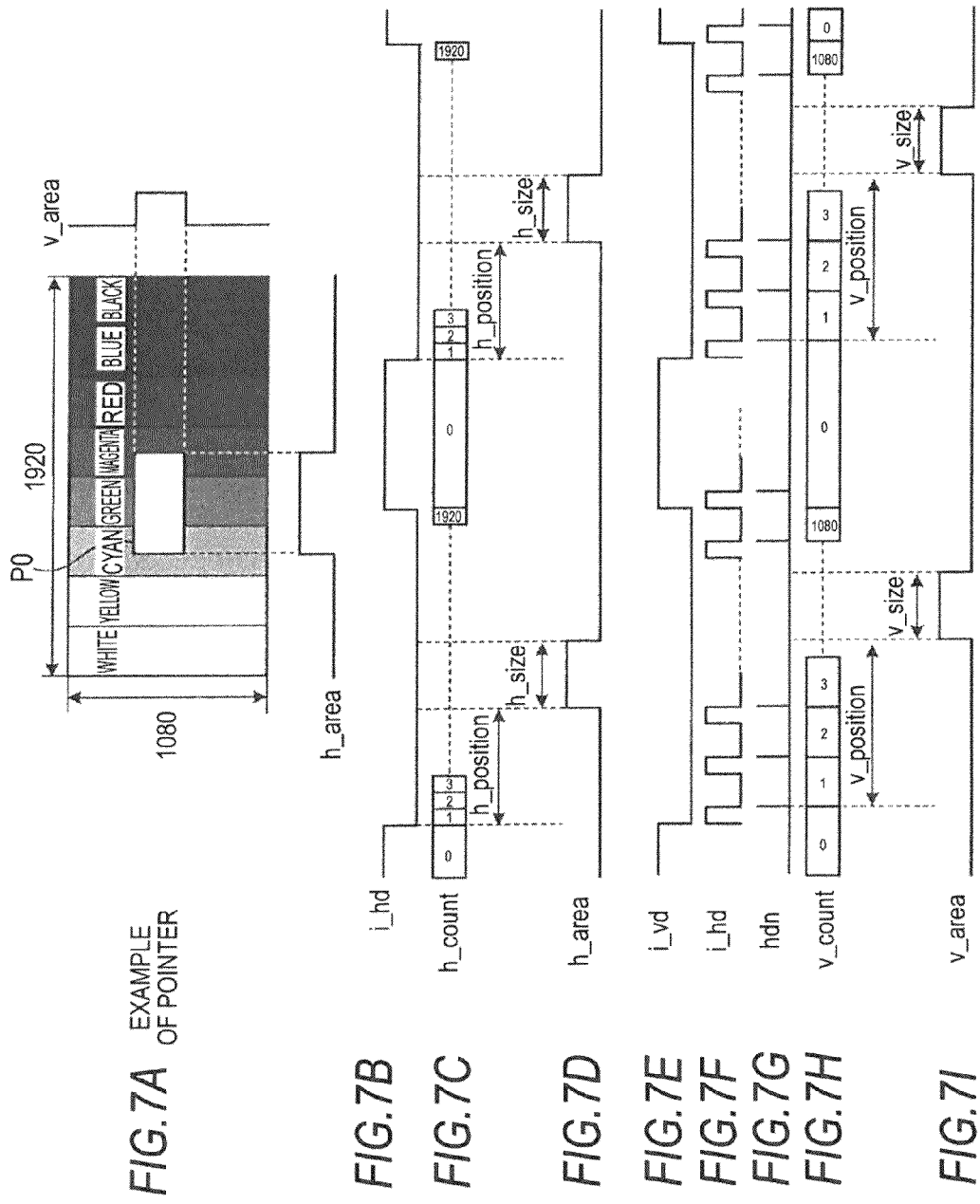
FIG. 7A is a pointer display example according to an embodiment of the present disclosure.
FIGS. 7B to 7I are timing charts of signal processing.

FIG. 7A shows a display state of a pointer P0 in an image. In this example, a color bar is displayed as an image, and the rectangular pointer P0 is displayed within the image. The pointer P0 is displayed to be opaque (namely, the original image is not visible in the pointer portion). In this example, one frame image is made up of 1920 horizontal pixels by 1080 horizontal lines.

FIGS. 7B to 7D show an example of horizontal timing.

FIG. 7B shows a horizontal drive signal [i_hd], and FIG. 7C shows a dot count signal [h_count]. Since the pixel count in one horizontal line is 1920, the count value is 0 when the horizontal drive signal is in the H level. When the horizontal drive signal changes to the L level, the count value is increased every pixel by 1 to reach 1920.

Moreover, a period when the pointer horizontal position signal [h_area] shown in FIG. 7D is in the H level corresponds to a period when the output signal is switched to the pointer signal. A period from the starting point of one horizontal line at which the horizontal drive signal [i_hd] changes from the H level to the L level to the rising time of the pointer horizontal position signal [h_area] corresponds to a period when a signal [h_position] representing the horizontal position of the pointer is output. Moreover, a period when the signal [h_area] is in the H level corresponds to a period when a horizontal size signal [h_size] is output.

FIGS. 7E to 7I show an example of horizontal timing.

FIG. 7E shows a vertical drive signal [i_vd], FIG. 7F shows a horizontal drive signal [i_hd], and FIG. 7G shows a horizontal edge detection signal [hdn]. FIG. 7H shows a line count signal [v_count]. Since the horizontal line count is 1080, the count value is 0 when the vertical drive signal is in the H level. When the horizontal drive signal changes to the L level, the count value is increased every line synchronized with the horizontal edge detection signal [hdn] by 1 to reach 1080.

Moreover, a period when the pointer vertical position signal [v_area] shown in FIG. 7I is in the H level corresponds to a period when the output signal is switched to the pointer signal. A period from the time when the line count signal [v_count] corresponds to the count value of 1 to the rising time of the pointer vertical position signal [v_area] corresponds to a period when a signal [v_position] representing the vertical position of the pointer is output. Moreover, a period when the signal [v_area] is in the H level corresponds to a period when a vertical size signal [v_size] is output.

In this way, a pointer display signal is mixed with the original image signal by the processing configuration shown in FIG. 2, and the pointer is displayed within the screen.

[5. Description of Setting State of Display Position in Stereoscopic Direction (FIGS. 8 to 9B)]

Next, a process of setting the display position on a virtual space set by 3D display will be described with reference to FIG. 8 and FIGS. 9A and 9B.

Figure 8:
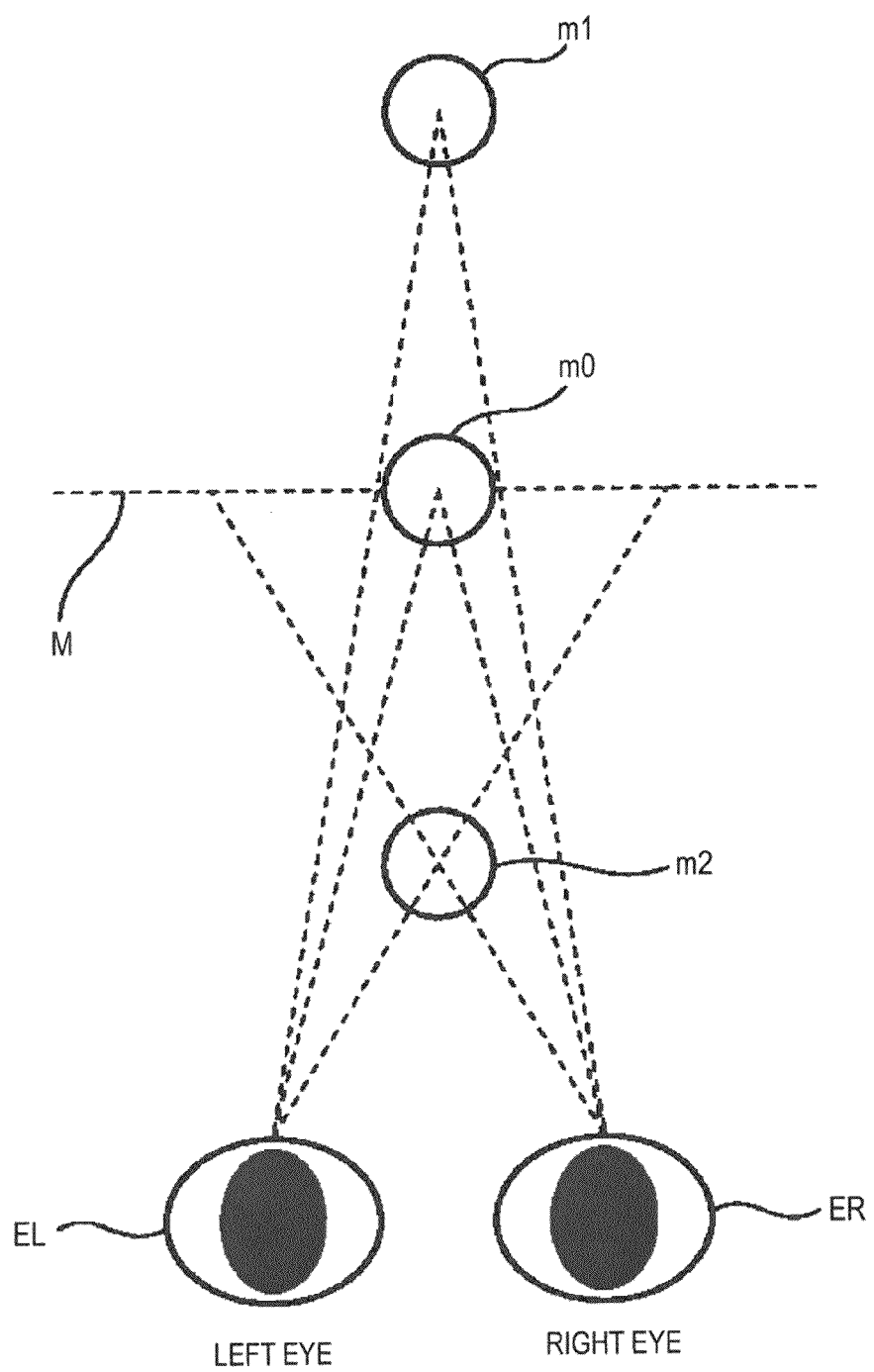
FIG. 8 is a diagram illustrating the setting state of a display position on a virtual space.

FIG. 8 shows a reference position (reference plane) M and the state of the front and rear sides of the reference position M.

As described above, when a display position set on a virtual space, of a display object m0 within an image is identical to the reference position M, the object m0 is displayed on the screen at the same position between the left and right channels. When a user looking at the screen observes the object on the reference position M, the line of sight from the left eye EL does not cross the line of sight from the right eye ER.

Moreover, as shown in FIG. 8, when an object m1 is disposed on the rear side of the reference position M, the angle between the line of sight from the left eye EL and the line of sight of the right eye ER decreases gradually.

In contrast, when an object m2 is disposed on the front side of the reference position M, the object will be located in the images of the two channels on the screen such that the line of sight from the left eye EL crosses the line of sight of the right eye ER.

Figure 9A:
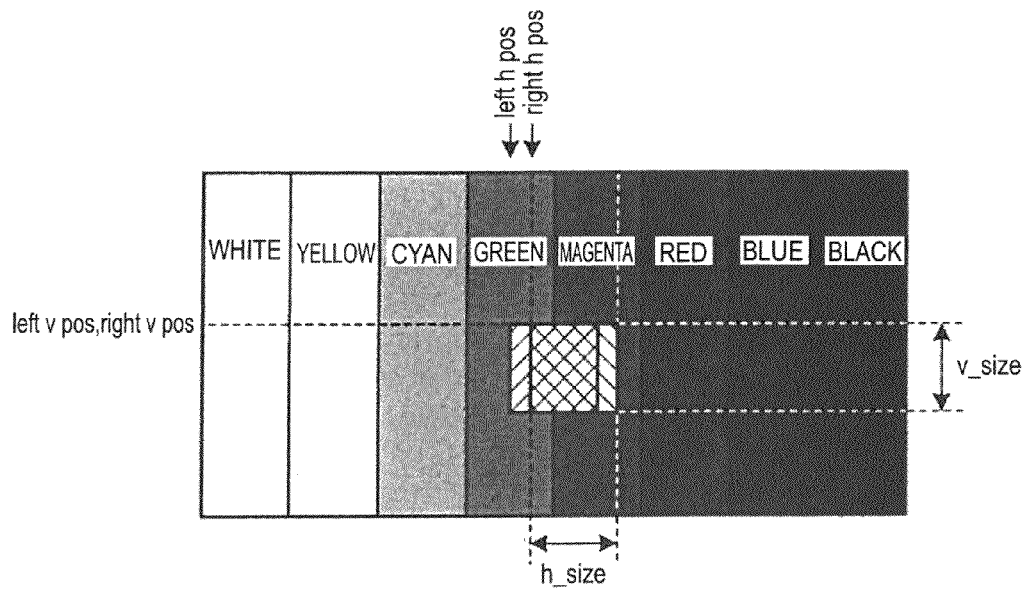
FIGS. 9A and 9B are diagrams showing an example in which a pointer is displayed on the rear side of a reference spatial coordinate position and on the front side thereof, respectively.

Thus, when the left and right images for displaying the pointer on the rear side of the reference position M are combined and displayed on one screen, a state shown in FIG. 9A is obtained. In FIG. 9A, the left channel (left eye) pointer is a rectangle within a range denoted by a rising diagonal stroke from bottom left to top right, and the right channel (right eye) pointer is a rectangle within a range denoted by a falling diagonal stroke from top left to bottom right. That is, the left channel pointer is disposed on the left side of the right channel pointer.

Figure 9B:
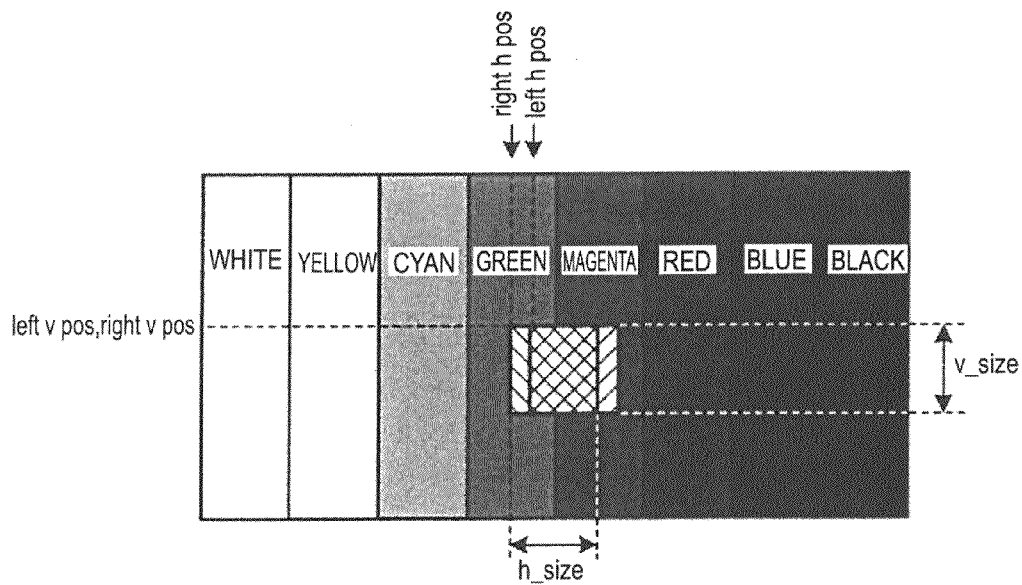

On the other hand, when the left and right images for displaying the pointer on the front side of the reference position M are combined and displayed on one screen, a state shown in FIG. 9B is obtained in which the left and right relationship of the pointer is reversed from that of FIG. 9A. In FIG. 9B, the left channel (left eye) pointer is a rectangle within a range denoted by a rising diagonal stroke from bottom left to top right, and the right channel (right eye) pointer is a rectangle within a range denoted by a falling diagonal stroke from top left to bottom right. In this case, the left channel pointer is disposed on the right side of the right channel pointer, which corresponds to the arrangement in which the two lines of sight cross each other shown in FIG. 8.

[6. Application Example of 3D Pointer to Subtitle Display POSITION]

Next, an example in which a 3D pointer display process of the present embodiment is applied to a process of setting the position of a subtitle in an image will be described with reference to the flowchart of FIG. 10.

Referring to FIG. 10, first, a user plays a video, halts the playing of the video at an image portion in which a subtitle is inserted, and displays the video as a still image at the halt position (step S51).

After that, a 3D pointer is displayed at a depth position at which the user wants to insert the subtitle (step S52). For example, the user sets the depth position of the 3D pointer at the same depth position as a subject in the image on which the viewer is most likely to focus.

Moreover, the CPU 13 or the like reads a parallax dot count (the horizontal image dot count) of the set 3D pointer, and the read parallax dot count is set as a parallax dot count of the subtitle inserted in the still image (and an image subsequent to the image).

By doing so, the subtitle is displayed at the depth position confirmed by the operator in the state where the 3D pointer is displayed. Thus, the display position of the subtitle can be set appropriately.

[7. Example of Displaying Parallax Dot Count of 3D Pointer]

FIG. 11 shows an example of displaying a 3D pointer P1 near a target subject A in which F1 is the range of an image as observed through 3D glasses. For example, similarly to the example of FIG. 10, a case of displaying the pointer P1 near the target subject A so that they are located at the same depth position may be considered. In this case, in the example of FIG. 11, a horizontal parallax dot count B of the pointer P1 is also displayed at the bottom left corner of the screen as a number. In the example of FIG. 11, the parallax dot count B is 30 dots. The parallax dot count is one which represents the amount of horizontal shift of the 3D pointer as a pixel count (dot count). As described in FIG. 8, when the two lines of sight cross each other, the parallax dot count may be represented as a minus ("−") number.

Moreover, when displaying the parallax dot count, for example, as shown in FIG. 12, the parallax dot count may be displayed in a fractional format B' in which the total lateral pixel count of an image is the denominator, and the parallax dot count is the numerator. Although the fraction is displayed in one row using a symbol "/" in the example of FIG. 12, the fraction may be displayed in two rows in which the total pixel count is on the lower part, and the parallax dot count is on the upper part. The format in which the lower part (denominator) is the total pixel count, and the upper part (numerator) is the parallax dot count is an example, and the relationship between the upper and lower parts may be reversed. By displaying the number relating to the pixel count in such a way, the user (operator) looking at the screen can easily understand the content of the guidance display. As a display format other than the display of such a pixel count, a display format of displaying the quantititive amount of shift of the left and right pointers in relation to the horizontal width of an entire screen may be used.

Furthermore, for example, as shown in FIG. 13, a display format in which a display of proportion C representing the proportion of a parallax dot count to the total lateral pixel count of an image is displayed within the screen may be used. In the example of FIG. 13, a percentage (%) is displayed as the display of proportion C. The display of parallax dot count B or B' shown in FIG. 11 or 12 may be displayed together with the display of proportion C shown in FIG. 13 so as to be arranged in a line (or in two rows).

The displaying of parallax dot count and the displaying of total pixel count within the screen can be realized by the control of the CPU 13 shown in FIG. 1, for example, by causing the combination processing unit 40 to superimpose an image of the corresponding number or character.

[8. Modified Example]

In the above-described embodiment, it is preferable to set the size of the displayed 3D pointer appropriately in accordance with the screen size. For example, by displaying the 3D pointer in a size corresponding to 1/200 or more of the entire screen size, the 3D pointer is displayed in a size such that stereoscopic display can be realized satisfactorily. As an example of displaying the 3D pointer in a size corresponding to 1/200 or more of the entire screen size, it is preferable to display a rectangular pointer having the size of the 3D pointer to ¹⁄₁₀ or more of the longitudinal size of an image and ¹⁄₂₀ or more of the lateral size of the image. By displaying the rectangular 3D pointer having such a size, the user looking at the screen can easily understand a stereoscopic position of the displayed plane of the pointer itself. Thus, the user can easily understand the depth position which is the purpose of displaying the 3D pointer.

The size of the 3D pointer is controlled by the CPU 13 shown in FIG. 1, for example. That is, the CPU 13 supplies the horizontal size signals [left_h_size] and [right_h_size] and the vertical size signals [left_v_size] and [right_v_size] to the left and right pointer generation units 30L and 30R so that the 3D pointer has the corresponding size. By supplying the horizontal and vertical size signals, the pointer display signals generated by the left and right pointer generation units 30L and 30R become signals which are displayed in the corresponding size.

When the user is allowed to freely adjust the display size of the 3D pointer, it is preferable to restrict the minimum size of the 3D pointer to ¹⁄₁₀ of the longitudinal size of the image and ¹⁄₂₀ of the lateral size of the image by the control of the CPU 13 shown in FIG. 1, for example.

In the respective drawings of the above-described embodiment, although the 3D pointer is displayed as a rectangle, the 3D pointer may be displayed as a figure or a mark of the other shape. For example, a circular figure may be displayed as the 3D pointer, and alternatively, a figure of a complex shape such as an arrow may be displayed as the 3D pointer. When a figure of such a complex shape is displayed as the 3D pointer, it is preferable to display the 3D pointer in a size corresponding to ¹⁄₂₀₀ or more of the entire screen size as described above.

Moreover, only the border of a rectangle or a circle may be displayed as the 3D pointer, and the original image may be displayed inside the border of the rectangle or circle. Even when displaying such a border, the semi-transparent display shown in the flowchart of FIG. 6 may be performed in accordance with the setting state of the display position.

Although the semi-transparent display shown in the flowchart of FIG. 6 is performed only when the pointer position is on the rear side of the reference position, the semi-transparent display may be always performed when the pointer is set to a certain depth position.

Figure 14:
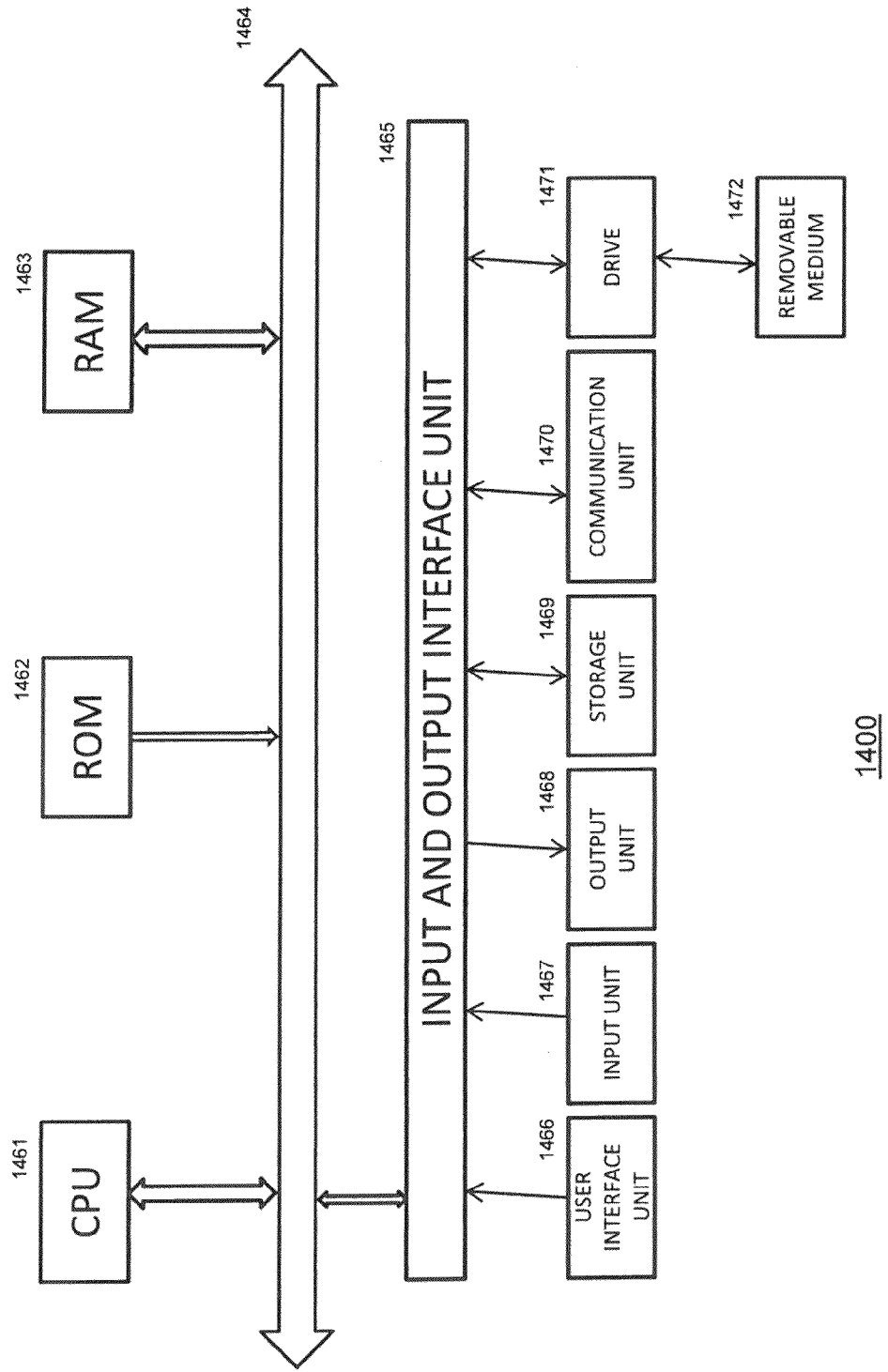
FIG. 14 is a block diagram showing a block diagram of a representative processing device.

The present described herein may be practiced using programmable digital computers. FIG. 14 is a block diagram 1400 of a representative computer system. The computer system 1400 includes at least one processor 1461, such as an Intel Core™ 2 microprocessor or a Freescale™ PowerPC™ microprocessor, coupled to a communications channel 1464. The computer system 1400 further includes an input and output interface unit 1465. Coupled to the input and output interface unit 1465 are a user interface unit 1466, an input device, or unit 1467 such as, e.g., a keyboard or mouse, an output device, or unit 1468 such as, e.g., a CRT or LCD display, a communications unit 1470, a data storage device, or unit 1469 such as a magnetic disk or an optical disk, and drive 1471, such as a CD-ROM, DVD-ROM, capable of reading/writing data onto a removable medium 1472. Read Only Memory (ROM) 1462 and Random-Access Memory (RAM) 1463 are each coupled to the communications channel 1464. The communications unit 1470 may be coupled to a network such as the Internet. Moreover, the computer system 1400 may be equipped with a browser program suitable for communication with the World Wide Web.

One skilled in the art will recognize that, although the data storage device, or unit 1469 and memory 1462, 1463 are depicted as different units, the data storage unit 1469 and memory 1462, 1463 can be parts of the same unit or units, and that the functions of one can be shared in whole or in part by the other, e.g., as RAM disks, virtual memory, etc. It will also be appreciated that any particular computer may have multiple components of a given type, e.g., processors 1461, input devices 1467, communications units 1470, etc.

The data storage device 1469 and/or memory 1462, 1463 may store an operating system such as Microsoft Windows 7®, Windows XP® or Vista™, Linux®, Mac OS®, or Unix®. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages; possibly using object oriented design and/or coding techniques. These platforms and operating systems may be accessed in a cloud computing or distributed computing environment.

The computer system 1400 may also include additional components and/or systems, such as network connections, additional memory, additional processors, network interfaces, input/output ports or busses. Also the programs and data may be received by and stored in the system in alternative ways. For example, a computer-readable storage medium (CRSM) reader, such as, e.g., a magnetic disk drive, magneto-optical drive, optical disk drive, or flash drive, may be coupled to the communications bus 1464 for reading from a computer-readable storage medium (CRSM) such as, e.g., a magnetic disk, a magneto-optical disk, an optical disk, or flash RAM. Accordingly, the computer system 1400 may receive programs and/or data via the CRSM reader. Further, it will be appreciated that the term "memory" herein is intended to include various types of suitable data storage media, whether permanent or temporary, such as transitory electronic memories, non-transitory computer-readable medium and/or computer-writable medium.

Two or more computer systems 1400 may be connected, e.g., in one or more networks, via, e.g., their respective communications interfaces and/or network interfaces (not depicted).

The present disclosure can be implemented as the following configurations.

(1) A 3D pointer generation device including:
a pointer generation unit that generates a pointer display signal for displaying a specific mark on a screen;
a left channel mixing unit that mixes the pointer display signal generated by the pointer generation unit with a left-channel image signal;
a right channel mixing, unit that mixes the pointer display signal generated by the pointer generation unit with a right-channel image signal; and
a control unit that receives an operation input for giving an instruction on the position of a pointer in a depth direction of a virtual space formed when a stereoscopic display is realized, and sets a pointer display position of the pointer display signal mixed by the left channel mixing unit and the pointer display position of the pointer display signal mixed by the right channel mixing unit to a horizontal position that is shifted so as to correspond to a parallax of the instructed position in the depth direction of the virtual space.

(2) The 3D pointer generation device according to (1), wherein the pointer display signal is mixed by the left channel mixing unit and the right channel mixing unit so that the pointer is displayed as semi-transparent.

(3) The 3D pointer generation device according to (1) or (2), wherein the control unit changes a display color of a pointer display image signal in at least two steps when the instructed position in the depth direction of the virtual space is on the front side of a reference position in which the display position on the screen is not changed between the left and right channels and when the instructed position is on the rear side of the reference position.

(4) The 3D pointer generation device according to any one of (1) to (3),
wherein the control unit causes the left channel mixing unit and the right channel mixing unit to mix the pointer display signal so that the pointer is displayed to be opaque when the instructed position in the depth direction of the virtual space is on the front side of a reference position in which the display position on the screen is not changed between the left and right channels and causes the left channel mixing unit and the right channel mixing unit to mix the pointer display signal so that the pointer is displayed as semi-transparent when the instructed position is on the rear side of the reference position.

(5) The 3D pointer generation device according to any one of (1) to (4),
wherein the control unit changes the display color of the pointer when the instructed position in the depth direction of the virtual space is at a reference position in which the display position on the screen is not changed between the left and right channels or is near the reference position.

(6) The 3D pointer generation device according to any one of (1) to (5),
wherein the control unit restricts the horizontal position and vertical position of the pointer based on the pointer display signal so as to be within a range such that a stereoscopic display can be realized with the left-channel image signal and the right-channel image signal.

(7) The 3D pointer generation device according to any one of (1) to (6),
wherein the control unit superimposes an image representing a pixel count corresponding to a horizontal shift amount of the pointer display position on the left-channel image signal and the right-channel image signal.

(8) The 3D pointer generation device according to any one of (1) to (6),
wherein the control unit superimposes an image displaying a pixel count corresponding to a horizontal shift amount of the pointer display position and a total lateral pixel count of an image signal in a fractional format on the left-channel image signal and the right-channel image signal.

(9) The 3D pointer generation device according to any one of (1) to (8),
wherein the control unit superimposes an image displaying the proportion of a pixel count corresponding to a horizontal shift amount of the pointer display position to a total lateral pixel count of an image signal on the left-channel image signal and the right-channel image signal.

(10) The 3D pointer generation device according to any one of (1) to (9),
wherein the display area of the pointer displayed on the screen based on the pointer display signal generated by the pointer generation unit is equal to or larger than 1/200 of the total display area of an image displayed based on the left-channel image signal and the right-channel image signal.

The present disclosure contains subject matter related to that disclosed in Japanese Priority Patent Application JP 2011-033640 filed in the Japan Patent Office on Feb. 18, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing apparatus for generating a stereoscopic pointer, comprising:
a receiving unit configured to receive position information for designating a position of the stereoscopic pointer, said position information including depth direction of said stereoscopic pointer;
a central processing unit (CPU) configured to generate horizontal pointer position signals based on the position information, and to set the horizontal position of the pointer in left and right channels to a horizontal position shifted so as to correspond to a parallax of the position of the stereoscopic pointer in the depth direction based on the depth direction of said position information;
a display control unit configured to cause the display of the stereoscopic pointer based on the horizontal pointer position signal;
a left pointer generation unit configured to generate a left channel pointer display signal based on left channel pointer position signals;
a right pointer generation unit configured to generate a right channel pointer display signal based on right channel pointer position signals;
a left channel mixing unit configured to mix the left channel pointer display signal with a left channel input image signal and generate a left channel output image signal;
a right channel mixing unit configured to mix the right channel pointer display signal with a right channel input image signal and generate a right channel output image signal; and
a combination processing unit configured to combine the left channel output image signal and the right channel output image signal and to generate an output image signal;
wherein the left channel input image signal includes at least one of a left channel input luminance signal, a left channel input first color difference signal, and a left channel input second color difference signal, and the right channel input image signal includes at least one of a right channel input luminance signal, a right channel input first color difference signal, and a right channel input second color difference signal.

2. An image signal processing apparatus according to claim 1, wherein said position information further includes horizontal position and vertical position of said stereoscopic pointer.

3. An image signal processing apparatus according to claim 2, wherein the CPU further generates vertical pointer position signals based on the position information.

4. An image signal processing apparatus according to claim 3, wherein the horizontal pointer position signals include left channel horizontal pointer position signals and right channel horizontal pointer position signals, the vertical pointer position signals include left channel vertical pointer position signals and right channel vertical pointer position signals.

5. An image signal processing apparatus according to claim 1, wherein the central processing unit (CPU) further generates instructions on the designated position of the stereoscopic pointer in a horizontal direction and a vertical direction.

6. An image signal processing apparatus according to claim 5, wherein the instruction on the designated position of the stereoscopic pointer in the depth direction is designated by scrolling a scroll unit on an input unit.

7. An image signal processing apparatus according to claim 6, wherein an instruction to move the position of the stereoscopic pointer in the depth direction of a virtual space to a front position is designated by scrolling the scroll unit toward a front side of the display as viewed from the user, and an instruction to move the position of the stereoscopic pointer in the depth direction of the virtual space to a rear position is designated by scrolling the scroll unit toward a rear side of the display as viewed from the user.

8. An image signal processing apparatus according to claim 7, wherein when the position of the stereoscopic pointer in the virtual space is not at a reference position or the position of the stereoscopic pointer in the virtual space is outside a predetermined area around the reference position, the pointer is displayed in a first color, and when the position of the stereoscopic pointer in the virtual space is at the reference position or the position of the stereoscopic pointer in the virtual space is within the predetermined area around the reference position, the pointer is displayed in a second color different from the first color.

9. An image signal processing apparatus according to claim 8, wherein when the position of the stereoscopic pointer in the virtual space is at a rear side of the reference position, the pointer is displayed as an object with a first degree of transparency in the first color, and when the position of the stereoscopic pointer in the virtual space is at a front side of the reference position, the pointer is displayed as an object with a second degree of transparency in the first color.

10. An image signal processing apparatus according to claim 8, wherein the reference position is a position at which the left channel output image signal and the right channel output image signal are substantially the same.

11. An image signal processing apparatus according to claim 1, wherein the position of the stereoscopic pointer is restricted to positions within a range where a stereoscopic image is displayed.

12. An image signal processing apparatus according to claim 1, wherein the stereoscopic pointer is displayed at a depth position corresponding to the depth direction of the stereoscopic pointer; and wherein a subtitle of a stereoscopic image is displayed at the depth position of the stereoscopic pointer.

13. An image signal processing apparatus for generating a stereoscopic pointer, comprising:
  a receiving unit configured to receive position information for designating a position of the stereoscopic pointer, said position information including depth direction of said stereoscopic pointer;
  a central processing unit (CPU) configured to generate horizontal pointer position signals based on the position information, and to set the horizontal position of the pointer in left and right channels to a horizontal position shifted so as to correspond to a parallax of the position of the stereoscopic pointer in the depth direction based on the depth direction of said position information; and
  a display control unit configured to cause the display of the stereoscopic pointer based on the horizontal pointer position signal;
  a left pointer generation unit configured to generate a left channel pointer display signal based on left channel pointer position signals;
  a right pointer generation unit configured to generate a right channel pointer display signal based on right channel pointer position signals;
  a left channel mixing unit configured to mix the left channel pointer display signal with a left channel input image signal and generate a left channel output image signal;
  a right channel mixing unit configured to mix the right channel pointer display signal with a right channel input image signal and generate a right channel output image signal; and
  a combination processing unit configured to combine the left channel output image signal and the right channel output image signal and to generate an output image signal;
  wherein the left channel output image signal includes at least one of a left channel output luminance signal, a left channel output first color difference signal, and a left channel output second color difference signal, and the right channel output image signal includes at least one of a right channel output luminance signal, a right channel output first color difference signal, and a right channel output second color difference signal.

14. An image signal processing apparatus for generating a stereoscopic pointer, comprising:
  a receiving unit configured to receive position information for designating a position of the stereoscopic pointer, said position information including depth direction of said stereoscopic pointer;
  a central processing unit (CPU) configured to generate horizontal pointer position signals based on the position information, and to set the horizontal position of the pointer in left and right channels to a horizontal position shifted so as to correspond to a parallax of the position of the stereoscopic pointer in the depth direction based on the depth direction of said position information; and
  a display control unit configured to cause the display of the stereoscopic pointer based on the horizontal pointer position signal;
  wherein a horizontal parallax dot count which represents an amount of horizontal shift of the stereoscopic pointer as a pixel count is displayed.

15. A method for generating a stereoscopic pointer, comprising the steps of:
  receiving position information for designating a position of the stereoscopic pointer, said position information including depth direction of said stereoscopic pointer;
  generating horizontal pointer position signals based on the position information, and setting the horizontal position of the pointer in left and right channels to a horizontal position shifted so as to correspond to a parallax of the position of the stereoscopic pointer in the depth direction based on the depth direction of said position information; and causing the display of the stereoscopic pointer based on the horizontal pointer position signal, and including a horizontal parallax dot count which represents an amount of horizontal shift of the stereoscopic pointer as a pixel count.

16. A non-transitory computer-readable medium storing a computer program that when executed on a computer causes to generate a stereoscopic pointer, the program comprising the steps of:
  receiving position information for designating a position of the stereoscopic pointer, said position information including depth direction of said stereoscopic pointer;
  generating horizontal pointer position signals based on the position information, and setting the horizontal position of the pointer in left and right channels to a horizontal position shifted so as to correspond to a parallax of the position of the stereoscopic pointer in the depth direction based on the depth direction of said position information; and
  causing the display of the stereoscopic pointer based on the horizontal pointer position signal, and including a horizontal parallax dot count which represents an amount of horizontal shift of the stereoscopic pointer as a pixel count.

* * * * *